Patented Mar. 17, 1925.

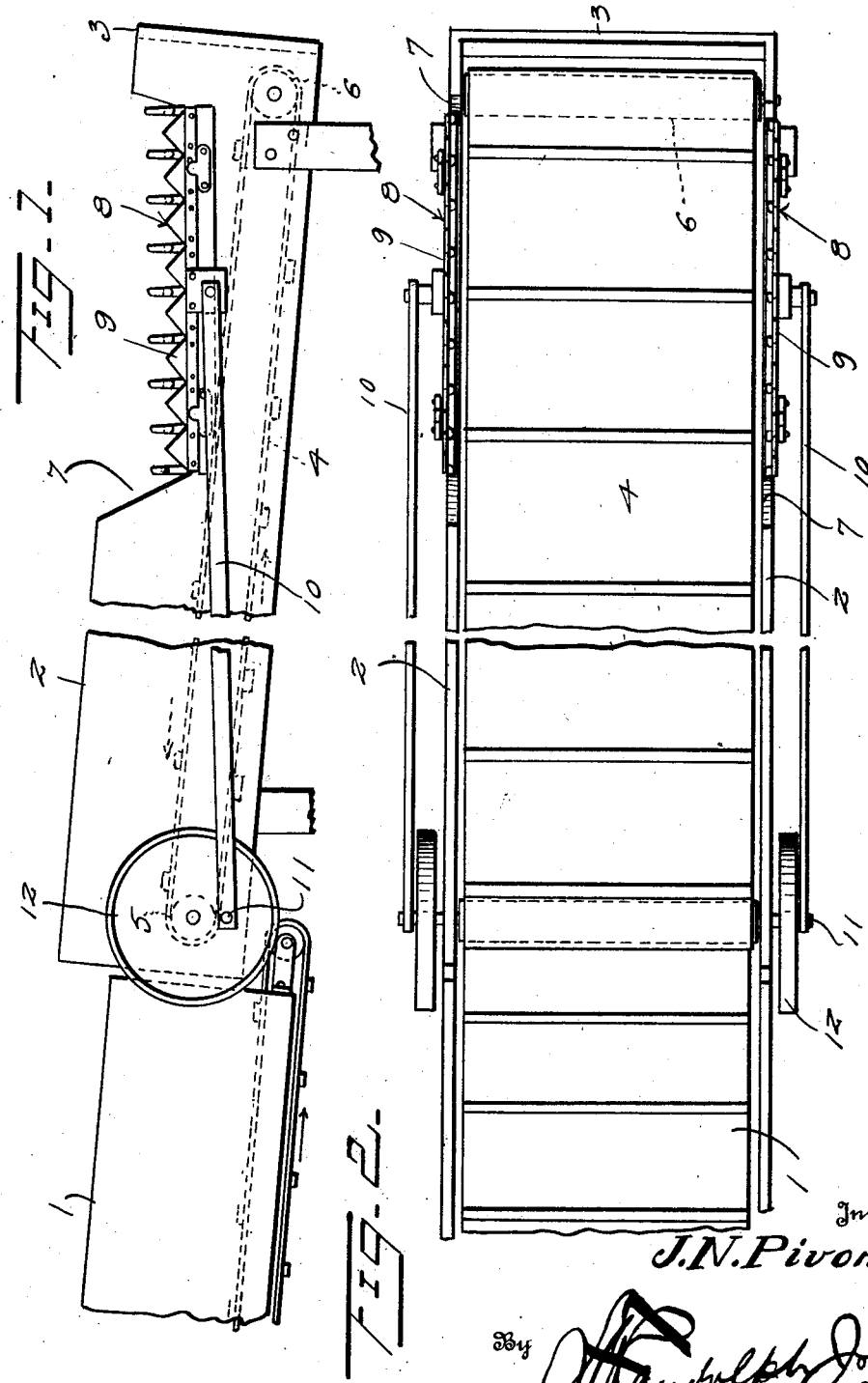

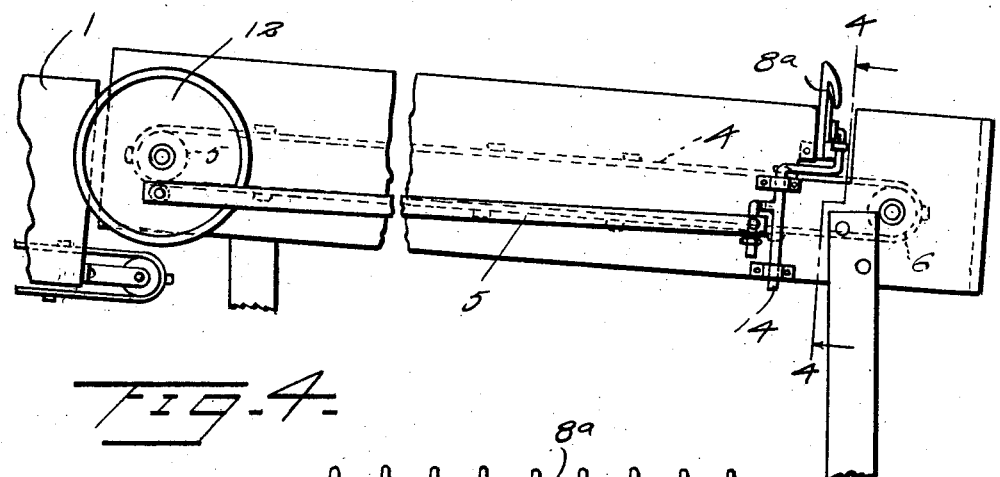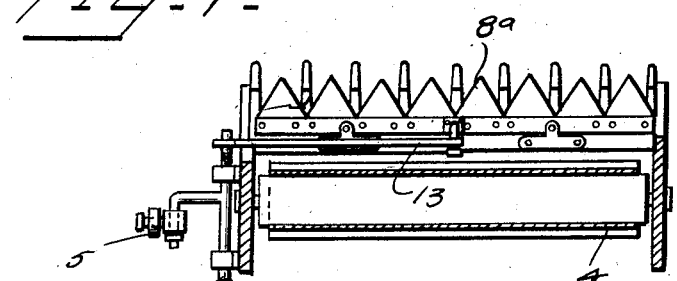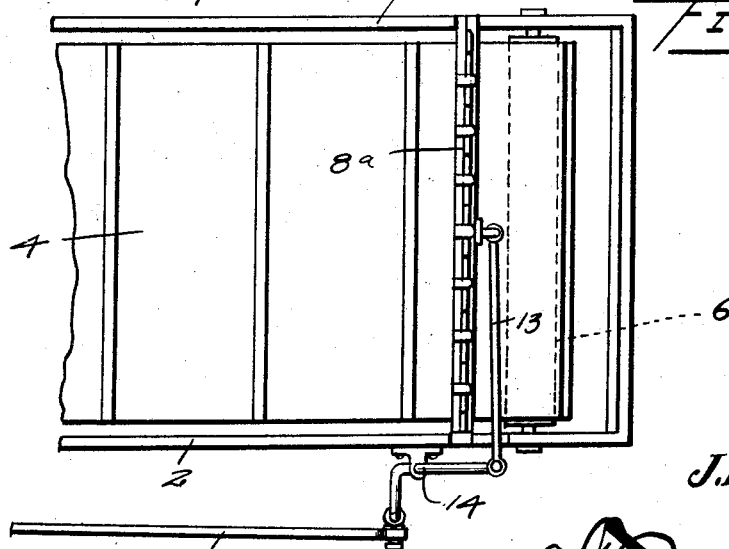

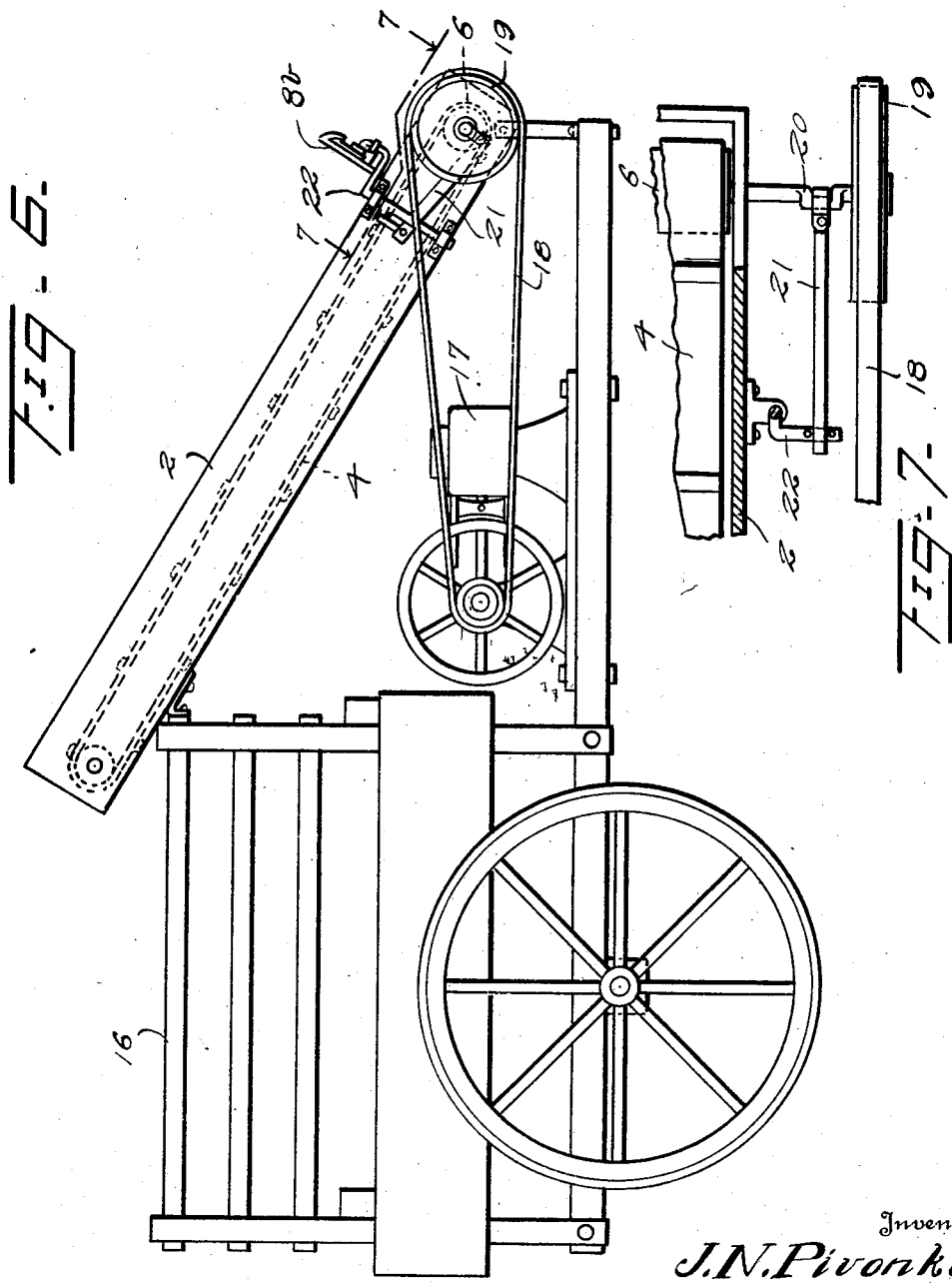

1,530,406

UNITED STATES PATENT OFFICE.

JOHN N. PIVONKA, OF DIVISION, KANSAS.

BUNDLE TOPPER.

Application filed March 20, 1924. Serial No. 700,654.

*To all whom it may concern:*

Be it known that I, JOHN N. PIVONKA, a citizen of the United States, residing at Division, in the county of Lane and State of Kansas, have invented certain new and useful Improvements in Bundle Toppers; and I do hereby declare the following to be a full, clear, and exact description of the invention, such as will enable others skilled in the art to which it appertains to make and use the same.

The present invention provides an attachment for use in conjunction with a self-feeder of a threshing machine for cutting off the heads of bundles of kaffir, maize, sargo or other analogous crops, thereby saving the grain for feed and delivering the heads to the feeder of the thresher.

Other objects and advantages will be apparent and suggest themselves as the nature of the invention is understood. While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a side view of a grain topper associated with the feeder of a threshing machine, the receiving end of the feeder being shown only, Figure 2 is a top plan view of the parts illustrated in Figure 1, Figure 3 is a view similar to Figure 1 of a modification, Figure 4 is a transverse sectional view on the line 4—4 of Figure 3, looking in the direction of the arrows, Figure 5 is a top plan view thereof, Figure 6 is a side view of a further modification, and Figure 7 is a sectional detail view on the line 7—7 of Figure 6.

Corresponding and like parts are referred to in the following description and designated in the several views of the drawings by like reference characters.

The numeral 1 designates a self-feeder such as generally provided for threshing machines. The present invention provides a topping attachment adapted to be associated with the self-feeder 1 and operates to remove the tops of bundles of grain and to deliver the tops to the self-feeder 1 which discharges them into the threshing machine. In this manner, the bundles are preserved intact to be used as feed or in any other preferred way. The topping machine comprises a suitable framework including sides 2 and an end 3, said sides constituting guards to retain the heads of the grain upon an endless apron 4, the upper run of which travels towards the feeder 1 so as to deliver the heads of grain thereto. The endless apron 4 is supported by means of rollers 5 and 6 at opposite ends of the topper frame. The upper edge portions of the side pieces 2 may be cut away, as indicated at 7, to provide clearance for a cutting mechanism 8 which operates to remove the heads of the grain when the bundles are placed in position for the action of the cutting mechanism. However, it is to be understood that it is not essential that the side pieces be cut away as they may be left intact. The cutting mechanism 8 may be of any preferred type and, as shown, embodies a reciprocating sickle 9 which is operated by means of a pitman 10 from a wrist pin 11 applied to a crank wheel 12 attached to the projecting end of the shaft of the roller 5. The attachment shown in Figures 1 and 2 admits of the bundles of grain being fed from each side of the endless apron 4, and as the heads of the grain are removed by the cutting mechanism, they drop upon the endless apron 4 and are delivered thereby to the endless feeder 1 which conveys them to the threshing mechanism (not shown) in a manner well understood.

In the modification shown in Figures 3, 4 and 5, the cutting mechanism 8ª is disposed transversely of the endless apron 4 and at the outer end thereof, and the movable cutting member is operated by means of a pitman 13, crank shaft 14 and pitman 15, the latter connecting an arm of the crank shaft 14 with the wrist pin of the crank wheel 12.

In the modification illustrated in Figures 6 and 7 the numeral 16 indicates a wagon, hay rack, box or header barge to which the topper is applied. A suitable motor 17, gasoline, electric or other type, is provided for driving the topper and is connected thereto by a drive belt 18 which passes around a pulley 19 on an extension of the lower rear shaft of the roller 6. The shaft of the roller 6 has a crank portion 21 with a crank shaft 22 which operates the cutting mechanism 8^b disposed transversely of the topper and at the lower rear end thereof.

What is claimed is:

1. A threshing machine attachment comprising in combination, spaced walls, an apron operable intermediate said walls, said walls being cut away, and cutting mechanisms associated with said aprons and disposed in the cut away portions of the walls and forming continuations of said walls.

2. A threshing machine attachment comprising in combination, a wall, a movable apron disposed relatively close to said wall, said wall having a cut away portion, and a cutting mechanism associated with said apron disposed in said portion and forming a continuation of the wall.

3. A threshing machine attachment comprising in combination, a framework having spaced side walls, and endless apron mounted on said framework and disposed intermediate said side walls, said side walls having cut away portions, a cutting mechanism at each side of the apron and disposed in said cut away portions, said mechanisms constituting continuations of said walls.

In testimony whereof I affix my signature in presence of two witnesses.

JOHN N. PIVONKA.

Witnesses:
WARREN V. YOUNG,
GUY THOMAS.